US010384571B2

(12) United States Patent
Lorey

(10) Patent No.: US 10,384,571 B2
(45) Date of Patent: Aug. 20, 2019

(54) SUSPENSION DEVICE

(71) Applicant: GRAMMER AG, Amberg (DE)

(72) Inventor: Konstantin Lorey, Schmidgaden (DE)

(73) Assignee: GRAMMER AG, Amberg (DE)

( * ) Notice: Subject to any disclaimer, the term of this patent is extended or adjusted under 35 U.S.C. 154(b) by 42 days.

(21) Appl. No.: 15/634,087

(22) Filed: Jun. 27, 2017

(65) Prior Publication Data
US 2018/0001805 A1    Jan. 4, 2018

(30) Foreign Application Priority Data

Jul. 1, 2016    (DE) .................. 10 2016 112 106

(51) Int. Cl.
*B60N 2/54*    (2006.01)
*B60N 2/50*    (2006.01)
(Continued)

(52) U.S. Cl.
CPC ............... *B60N 2/505* (2013.01); *B60N 2/02* (2013.01); *B60N 2/0232* (2013.01); *B60N 2/502* (2013.01);
(Continued)

(58) Field of Classification Search
CPC .......... B60N 2/505; B60N 2/502; B60N 2/54; B60N 2/544; B60N 2/507; B60N 2/165; B60N 2/1655; B60N 2/166; B60N 2/1645; B60N 2/1675; B60N 2/045; B60N 2/02; B60N 2/50; B60N 2/522; B60N 2/1615; B60N 2/0232; B60N 2002/0236
(Continued)

(56) References Cited

U.S. PATENT DOCUMENTS 2,840,140 A * 6/1958 Harrington ............ B60N 2/502
248/430
3,049,330 A * 8/1962 Coons .................. B60N 2/2352
248/419

(Continued)

FOREIGN PATENT DOCUMENTS

DE    1896880    7/1964
DE    2753105    6/1979
(Continued)

OTHER PUBLICATIONS

Extended Search Report for European Patent Application No. 17175413.8, dated Nov. 28, 2017, 3 pages.

*Primary Examiner* — Ingrid M Weinhold
(74) *Attorney, Agent, or Firm* — Sheridan Ross P.C.

(57) ABSTRACT

Suspension device for a vehicle seat, comprising an upper suspension portion and a lower suspension portion, which are interconnected by a first swivel connector and a second swivel connector, and the first and the second swivel connector are pivoted in each case about a swivel pin in the case of an oscillating movement of the upper suspension portion relative to the lower suspension portion, wherein a first toothed wheel element which is rotatable about a first axis of rotation is arranged on the first swivel connector for adjusting a position of a first spring unit, by means of which a spring force and a spring rate of the suspension device can be changed, the first toothed wheel element being in operative contact with a second toothed wheel element which is rotatable about a second axis of rotation.

7 Claims, 5 Drawing Sheets

(51) Int. Cl.
  *B60N 2/52* (2006.01)
  *B60N 2/02* (2006.01)
(52) U.S. Cl.
  CPC ............. *B60N 2/507* (2013.01); *B60N 2/522* (2013.01); *B60N 2/54* (2013.01); *B60N 2/544* (2013.01); *B60N 2002/024* (2013.01); *B60N 2002/0236* (2013.01)
(58) Field of Classification Search
  USPC ....... 248/584, 585, 595, 421, 575, 560, 562; 297/344.15, 344.16, 344.1; 296/65.02
  See application file for complete search history.

(56) References Cited

U.S. PATENT DOCUMENTS

| | | | | |
|---|---|---|---|---|
| 3,572,624 | A * | 3/1971 | Holdampf | B60N 2/502 248/564 |
| 3,599,232 | A * | 8/1971 | Tabor | B60N 2/502 248/567 |
| 4,520,986 | A * | 6/1985 | Liljequist | B60N 2/502 248/419 |
| 4,573,657 | A * | 3/1986 | Sakamoto | B60N 2/502 248/421 |
| 4,624,437 | A * | 11/1986 | Sakamoto | B60N 2/502 108/145 |
| 4,648,578 | A * | 3/1987 | Sakamoto | B60N 2/502 248/396 |
| 4,650,148 | A * | 3/1987 | Sakamoto | B60N 2/502 248/421 |
| 4,664,352 | A * | 5/1987 | Shibuki | B60N 2/502 188/266.7 |
| 4,702,454 | A * | 10/1987 | Izumida | B60N 2/502 248/576 |
| 4,714,227 | A * | 12/1987 | Holm | B60N 2/502 248/550 |
| 4,786,024 | A * | 11/1988 | Goetz | A47C 3/38 248/157 |
| 4,948,081 | A | 8/1990 | Hatta | |
| 4,993,678 | A * | 2/1991 | Easter | B60N 2/1615 248/371 |
| 5,116,016 | A * | 5/1992 | Nagata | B60G 15/063 248/543 |
| 5,150,870 | A | 9/1992 | Matsuura | |
| 5,580,027 | A * | 12/1996 | Brodersen | B60N 2/502 248/162.1 |
| 5,882,061 | A * | 3/1999 | Guillouet | B60N 2/1615 248/421 |
| 5,957,426 | A * | 9/1999 | Brodersen | B60N 2/502 248/421 |
| 6,484,995 | B1 | 11/2002 | Nemoto | |
| 6,488,337 | B1 * | 12/2002 | De Voss | B60N 2/181 248/419 |
| 6,666,423 | B1 | 12/2003 | Nemoto | |
| 6,902,045 | B2 * | 6/2005 | Oliver | B60G 15/063 188/321.11 |
| 6,935,693 | B2 * | 8/2005 | Janscha | B60N 2/502 248/550 |
| 7,032,874 | B2 * | 4/2006 | Meyers | B60N 2/505 248/421 |
| 7,517,020 | B2 * | 4/2009 | Yokota | B60N 2/1615 248/421 |
| 7,571,886 | B2 * | 8/2009 | Carter | B60N 2/502 248/419 |
| 8,016,258 | B1 * | 9/2011 | Boyarski | A01D 34/82 248/421 |
| 8,596,721 | B2 * | 12/2013 | Ozawa | B60N 2/165 248/421 |
| 8,800,947 | B2 * | 8/2014 | Suzuki | B60N 2/161 248/421 |
| 9,073,456 | B2 * | 7/2015 | Hoshi | B60N 2/1615 |
| 2003/0201660 | A1 * | 10/2003 | Janscha | B60N 2/502 297/216.17 |
| 2007/0194613 | A1 * | 8/2007 | Kojima | B60N 2/0705 297/344.15 |
| 2010/0001569 | A1 * | 1/2010 | Shinozaki | B60N 2/1615 297/344.15 |
| 2013/0161989 | A1 * | 6/2013 | Ito | B60N 2/1615 297/313 |
| 2016/0114703 | A1 * | 4/2016 | Fujita | B60N 2/0232 297/344.1 |

FOREIGN PATENT DOCUMENTS

| | | |
|---|---|---|
| DE | 3534378 | 5/1986 |
| DE | 44 03 506 A1 | 7/1986 |
| GB | 2166948 | 5/1986 |
| WO | WO 91/04881 | 4/1991 |

* cited by examiner

SUSPENSION DEVICE

CROSS-REFERENCE TO RELATED APPLICATIONS

This application claims the benefit of German Patent Application No. DE 10 2016 112 106.1 filed Jul. 1, 2016, the entire contents of which are incorporated herein by reference.

FIELD

The invention relates to a suspension device, in particular for a vehicle seat, comprising an upper suspension portion and a lower suspension portion, which can be interconnected by a first swivel connector and a second swivel connector.

Suspension devices of this type for vehicle seats are known from the prior art, wherein the upper suspension portion, the lower suspension portion, the first and the second swivel connector form a parallelogram, and therefore the upper suspension portion is in parallel with the lower suspension portion, even in the case of a spring movement. For the suspension of the vehicle seat, the suspension devices preferably comprise a spring, wherein the extension force of the suspension device can be adjusted by tensioning the spring.

However, when a relatively heavy driver sits down on the vehicle seat and wishes to adjust the extension force according to his weight, he must considerably increase the initial tension of the spring, which means a substantial exertion of force, and a rapid adjustment is also not provided thereby.

SUMMARY

It is accordingly an object of the present invention to provide a suspension device by means of which the extension force can be adjusted rapidly and with little exertion of force.

This object is achieved according to the features of claim 1. Advantageous embodiments of the invention can be found in the dependent claims.

The core concept of the invention is to provide a suspension device for a vehicle seat, comprising an upper suspension portion and a lower suspension portion, which are interconnected by a first swivel connector and a second swivel connector, and the first and the second swivel connector are pivoted in each case about a swivel pin in the case of an oscillating movement of the upper suspension portion relative to the lower suspension portion, wherein a first toothed wheel element which is rotatable about a first axis of rotation is arranged on the first swivel connector for adjusting a position of a first spring unit, by means of which a spring force and a spring rate of the suspension device can be changed, the first toothed wheel element being in operative contact with a second toothed wheel element which is rotatable about a second axis of rotation.

Particularly advantageously, the first toothed wheel element is rotatably arranged relative to the first swivel connector. More advantageously, the first swivel connector is arranged on the lower suspension portion by means of a first swivel pin, and the second swivel connector is arranged thereon by means of a second swivel pin, and thus can each be pivoted about the corresponding swivel pin.

Particularly advantageously, the upper suspension portion comprises a vehicle seat, in particular a vehicle seat having a seat portion and a backrest.

The term "spring unit" is understood to mean a unit which comprises at least one spring in the conventional sense. A spring unit or a spring can be designed to be mechanical, hydraulic or pneumatic. Advantageously, the spring can also be understood to be the spring unit itself. Said spring is preferably a tension spring, which can be designed in various ways. By means of a mechanical design, the weight of the suspension device can be further reduced, and a simpler construction can be provided.

The upper suspension portion, the lower suspension portion, and the first and the second swivel connector preferably form a parallelogram. Advantageously, the first and the second swivel connector are pivotally connected both to the lower suspension portion and to the upper suspension portion, wherein the first swivel connector is pivotally connected to the upper suspension portion by means of a third swivel pin, and the second swivel connector is pivotally connected to the upper suspension portion by means of a fourth swivel pin.

According to a preferred embodiment, the suspension device comprises more than one spring unit, that is to say in addition to the first spring unit, also a second, third, etc. spring unit, wherein each spring unit comprises at least one spring so that the construction height of the suspension device can be still further reduced thereby, since a force applied to the suspension device can be absorbed by two or more springs. As a result, the springs can thus have smaller dimensions. It is particularly advantageous to provide two springs for the suspension device. However, any desired number of springs, in particular two or more, can also be provided.

In this case, the first and the second end region of the spring unit are preferably the first and second end of the spring, wherein particularly preferably, the first and/or the second end of the spring comprise a eyelot or the like so that the spring and/or the spring unit can easily be connected to, in particular suspended or hung by, openings or devices provided for this purpose.

According to the invention, the spring rate and the extension force of the suspension device according to claim 1 is changed by adjusting the position of the first spring unit and not by changing the spring tension of the spring unit, that is to say in particular of the spring.

In this case, adjusting the position is equivalent to changing the spatial location of the spring unit or the spring units. By changing the position of the spring unit or of the spring of the spring unit, the length of a lever acting on the spring unit is changed.

According to a preferred embodiment, it is particularly advantageous for the first spring unit to be connected by a first end region by means of an adjustment device which can be operated by the first toothed wheel element to the first swivel connector, and by a second end region to the lower suspension portion.

The position of the second end region of the first spring unit is substantially constant in this case. Advantageously, the adjustment device is rigidly connected to the first toothed wheel element so that during a rotation of the first toothed wheel element, the adjustment device is operated correspondingly.

As a result, by means of the adjustment device, by operating the first toothed wheel element, in particular the position or location of the first end region of the first spring unit can be adjusted. In particular, as a result, the first end region is adjusted relative to the lower suspension portion, which preferably can be rigidly connected to a base, a chassis or the like. In this case, the lever acting on the first spring unit extends from a first swivel pin of the first swivel connector with the lower suspension portion as far as the first end region of the spring unit. By adjusting or displacing the first end region of the spring unit, the length of the lever can be changed so that the spring rate and the extension force of the suspension device can thereby be changed. The first end region thus accordingly comprises the force transmission point of the spring unit.

The extension force is changed on the basis of the following relationship. As is known, a torque is proportional to the length of a lever when the applied force is constant. By adjusting the position of the first end region, the length of the lever is changed. If a relatively heavy driver sits on the vehicle seat, which has the suspension device according to the invention, then the lever must accordingly be longer than in the case of a light driver.

As a result of the fact that, according to the invention, it is not the spring tension which is changed in order to change the extension force, but rather only the location of the spring unit, merely a small force is required from a user in order to change the extension force of the suspension device. As a result, it is also possible to change the extension force very rapidly.

According to a preferred embodiment, an operating element is provided which is connected to the second toothed wheel element by means of the second axis of rotation, by means of which operating element the first toothed wheel element can be operated and adjusted.

Alternatively, in this case, it is conceivable for an electric drive, an electric motor gear assembly or an electric motor to be connected to the second toothed wheel element by means of the second axis of rotation, wherein the second toothed wheel element can be operated by means of the motor, and the first toothed wheel element can be operated and adjusted according to the operation of the second toothed wheel element. The drive, the motor gear assembly or the motor is preferably configured to be self-locking.

According to a particularly preferred embodiment, the first axis of rotation of the first toothed wheel element and the second axis of rotation of the second toothed wheel element are formed so that they are perpendicular to one another. Further advantageously, the first axis of rotation extends in a horizontal direction B of the seat, and the second axis of rotation extends in a longitudinal direction L of the seat. Particularly preferably, the first and the second toothed wheel element form a worm gear.

Alternatively, according to another preferred embodiment, the first axis of rotation of the second toothed wheel element and the second axis of rotation of the second toothed wheel element can be formed so that they are perpendicular to one another.

More advantageously, the operating element is arranged in the region of a seat front face or in the region of the seat rear face.

Said spring rate should also be maintained during an oscillation process of the upper suspension portion relative to the lower suspension portion. By means of the relative movement of the upper suspension portion with respect to the lower suspension portion, the first toothed wheel element is correspondingly moved relative to the lower suspension portion due to the connection to the swivel connector.

According to the arrangement of the lower suspension portion, the upper suspension portion, the first and the second swivel connector as a parallelogram, the first toothed wheel element moves on a circular path in the case of a relative movement of the upper suspension portion with respect to the lower suspension portion. Likewise, the first swivel connector moves on a circular path together with the first toothed wheel element which is arranged thereon.

Preferably, the second toothed wheel element, as well as the first toothed wheel element, is connected to the first swivel connector. The second toothed wheel element is accordingly likewise moved on a circular path when the first swivel connector is pivoted about the first swivel pin. The arrangement of the first and the second toothed wheel element does not produce any relative movement of the toothed wheel elements with respect to one another, and therefore even during oscillation of the upper suspension portion with respect to the lower suspension portion, the SEAT value is not changed or influenced.

According to another embodiment, the adjustment device comprises a first suspending device, to which the first end region of the first spring unit can be connected, wherein the first suspending device is eccentrically arranged on the adjustment device.

When adjusting the position of the first spring unit, by means of the eccentric arrangement, preferably the first end region is rotated and thus the position of the first spring unit is changed.

According to another embodiment, the adjustment device comprises a second suspending device, to which a first end region of a vibration damper can be connected, the second suspending device being eccentrically connected to the adjustment device, and a second end region of the vibration damper being able to be connected to the lower suspension portion.

By such an arrangement of the vibration damper, it is therefore possible to adapt the damping performance of the vibration damper and thus the damping performance of the suspension when adjusting the extension force, preferably to the driver's weight. If the lever is elongated, the lift of the vibration damper and the effective lever for a damping force introduction also increase correspondingly. Accordingly, when the lever is shortened, the lift of the vibration damper is reduced.

According to a preferred embodiment, the first axis of rotation of the first toothed wheel element corresponds to the first swivel pin of the first swivel connector. As a result, it is possible to arrange the first toothed wheel element in a fixed position except for rotation.

If the upper suspension portion moves during a deflection thereof relative to the lower suspension portion, then the first swivel connector is pivoted about the first swivel pin. Since the first toothed wheel element is connected to the swivel connector by means of the first axis of rotation, the first toothed wheel element likewise undergoes a pivoting movement about the first swivel pin, regardless of the position of the first axis of rotation.

If the first axis of rotation now corresponds to the first swivel pin, then the first toothed wheel element is rotated only in a fixed position, and is not pivoted about the first swivel pin. Therefore it is not necessary for the second toothed wheel element to follow the movement of the first swivel connector, and therefore the second toothed wheel element can also be arranged in a fixed position except for rotation.

If, however, the first axis of rotation does not coincide with the first swivel pin, then when the first swivel connector is pivoted about the first swivel pin, the first toothed wheel element is likewise pivoted about the first swivel pin. Accordingly, it is also necessary for the second toothed wheel element to adapt to this pivoting movement. If, for example, the first toothed wheel element is pivoted clockwise, that is to say forwards in the longitudinal direction of the seat, then the toothed wheel element also moves downwards. In this case, it should also be noted that the second toothed wheel element follows the movement of the first toothed wheel element, so that there is still operative contact between the first and the second toothed wheel element.

It therefore appears to make sense in this case to likewise connect the second swivel pin of the second toothed wheel element to at least the first swivel connector, since then the movement of the first swivel connector can thereby be transmitted to the second swivel pin.

In general, the spring rate or the damping performance can be changed substantially proportionately to the driver's weight, by means of which the oscillation of the upper suspension portion relative to the lower suspension portion can accordingly be adapted to the driver's weight. This results in better SEAT values overall.

Furthermore, when an electric motor or the like is provided, this results in further advantages.

For example, the electric motor can be controlled accordingly so as to create a kind of memory function, in particular for adjusting the height of the seat. Thus, the spring unit can be adjusted according to the parameters, for example in the case of a corresponding height adjustment of the seat and/or to the driver's weight.

It is also conceivable that, during a journey, the spring force or the spring rate can interactively influence the SEAT values by a corresponding rotation of the first toothed wheel element by the motor.

Further advantageous embodiments can be found in the dependent claims.

BRIEF DESCRIPTION OF THE DRAWINGS

Further aims, advantages and expedient uses of the present invention can be found below from the description in conjunction with the drawings, in which.

In the drawings, like components are each to be provided with corresponding reference numerals. For the sake of greater clarity, in some drawings components may not be provided with a reference numeral, but have been denoted at another point.

DETAILED DESCRIPTION

Figure 1:
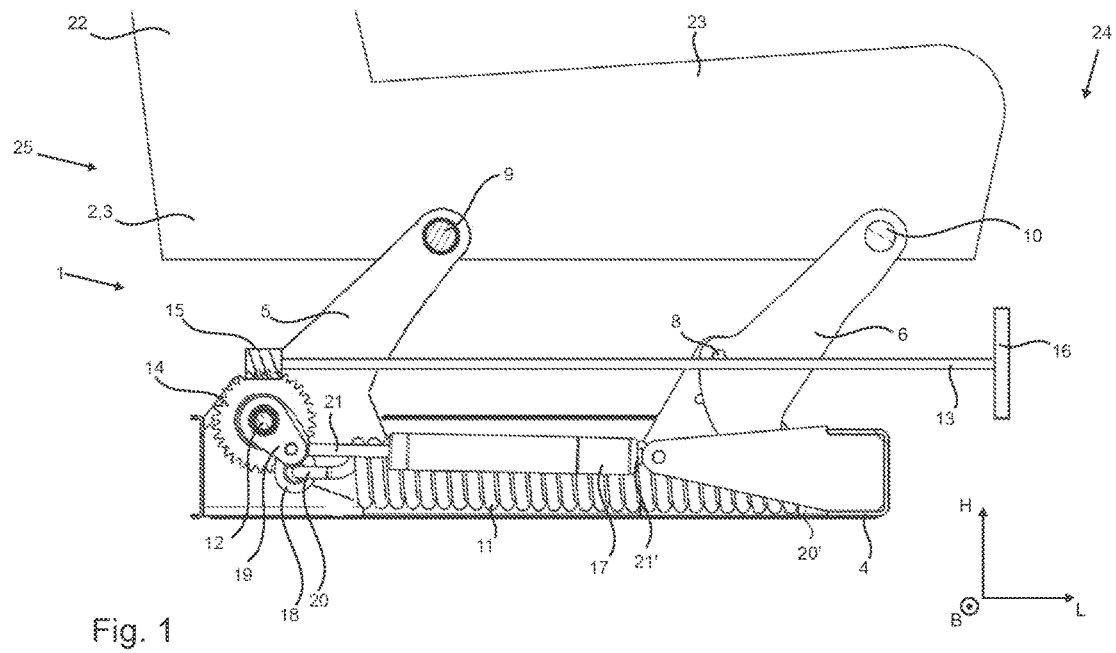
FIG. 1 is a schematic side view of a preferred embodiment.

FIG. 1 shows a suspension device 1 according to a preferred embodiment, wherein an upper suspension portion 3 is connected to a lower suspension portion 4 by means of a first 5 and a second swivel connector 6, and the first swivel connector 5 can be pivoted about a first swivel pin 7, and the second swivel connector 6 can be pivoted about a second swivel pin 8. The first swivel connector 5 is pivotally connected to the upper suspension portion 3 by means of a third swivel pin 9, and the second swivel connector 6 is pivotally connected to the upper suspension portion 3 by means of a fourth swivel pin 10.

In this case, the upper suspension portion 3 comprises the vehicle seat 2, in particular a seat portion 23 and a backrest 22.

As can also be seen, a first toothed wheel element 14 is arranged on the first swivel connector 5 by means of a first axis of rotation 12, wherein the first toothed wheel element 14 is in operative contact with a second toothed wheel element 15.

Figure 2:
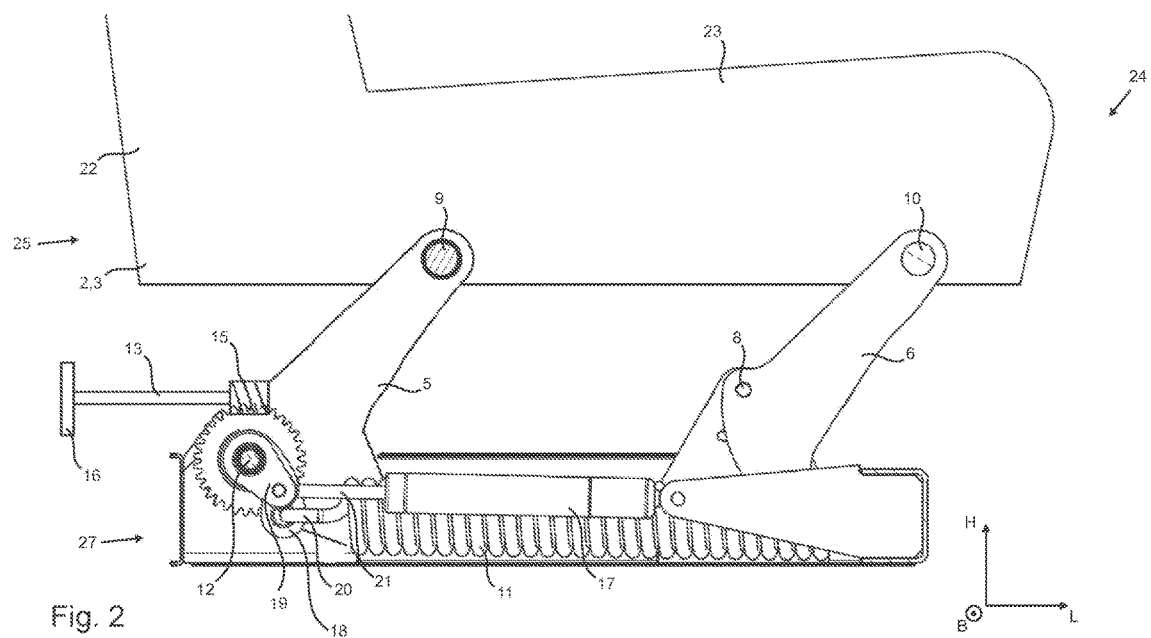
FIG. 2 is a schematic side view of another embodiment.

By operating the second toothed wheel element 15, in the present case by operating an operating element 16, which is arranged on the second axis of rotation 13 in a region of the seat front face 24 or the seat rear face 25, as shown in FIG. 2, the first toothed wheel element 14 is likewise operated and in particular adjusted. However, it is also conceivable for the operating element 16 to be laterally arranged on the seat, in particular when the first axis of rotation 12 is formed in parallel with the second axis of rotation 13.

By means of the second toothed wheel element 15, an adjustment device 25 is connected to a first suspending device 18 and a second suspending device 19, wherein the first 18 and the second suspending device 19 are arranged eccentrically on the first toothed wheel element. Furthermore, a first end region 20 of the spring unit 11 is connected to the first suspending device 18, and a first end region 21 of a vibration damper 17 is connected to the second suspending device 19. A second end region 20' of the spring unit 11 and a second end region 21' of the vibration damper 17 are connected to the lower suspension portion 4 in this case.

By rotating the first toothed wheel element 14, the first 18 and the second suspending device 19 are pivoted about the first axis of rotation 12, by means of which the position of the spring unit 11 and of the vibration damper 17 is changed, and thereby the damping performance of the vibration damper 17, the extension force and the spring rate of the spring unit 11.

The first toothed wheel element 14 is operated by a second toothed wheel element 15 in this case, wherein the first 14 and the second toothed wheel element 15 together form a worm gear. By operating the operating lever 16, that is to say by rotating the operating lever 16 about the second axis of rotation 13, which is formed so that it is perpendicular to the first axis of rotation 12 in the present case, the second toothed wheel element 15, and thus the first toothed wheel element 14, which is in operative contact with the second toothed wheel element 15, is operated and adjusted. By adjusting the position of the first toothed wheel element 14, in particular the spring rate or the extension force is determined.

In this case, the second axis of rotation 13 is connected at least to the first swivel connector 5, since in the present case, the first swivel pin 7 does not coincide with the first axis of rotation 12.

By means of this arrangement, it is possible in this case for the second toothed wheel element 15 to be able to follow the movement, in particular the pivoting movement of the first swivel connector 5 during a spring movement of the upper suspension portion 3 relative to the lower suspension portion 4 of the first toothed wheel element 14, and therefore the first 14 and the second toothed wheel element 15 are still in operative contact.

Figure 3A:
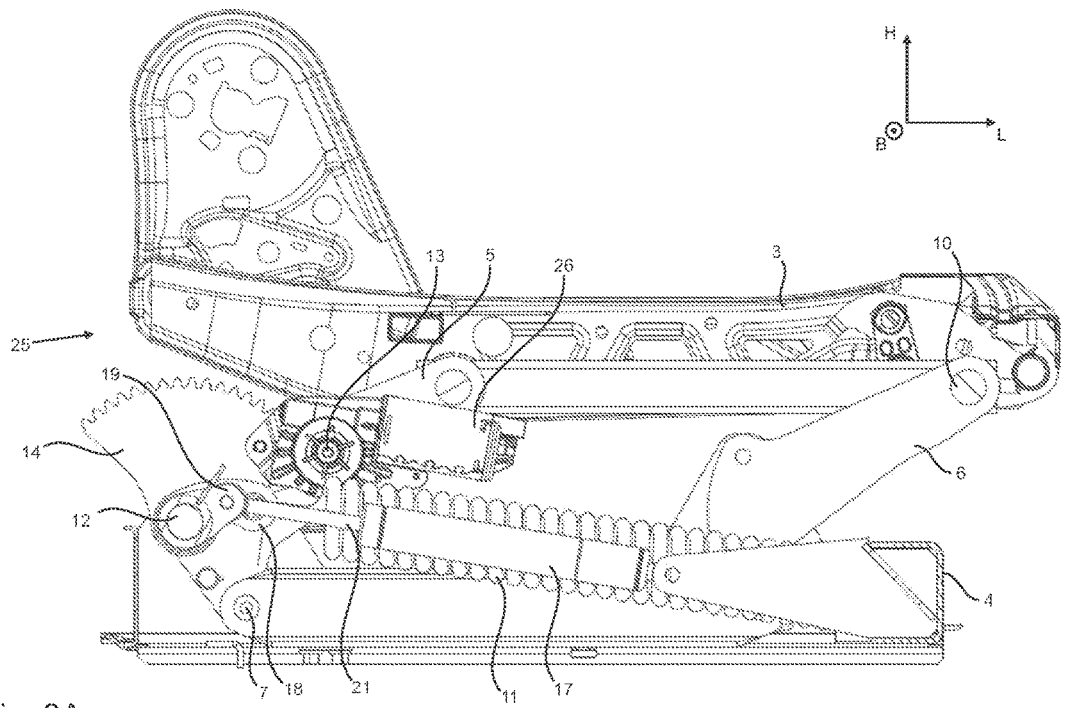
FIG. 3A is a first side view of an alternative embodiment.
Figure 3B:
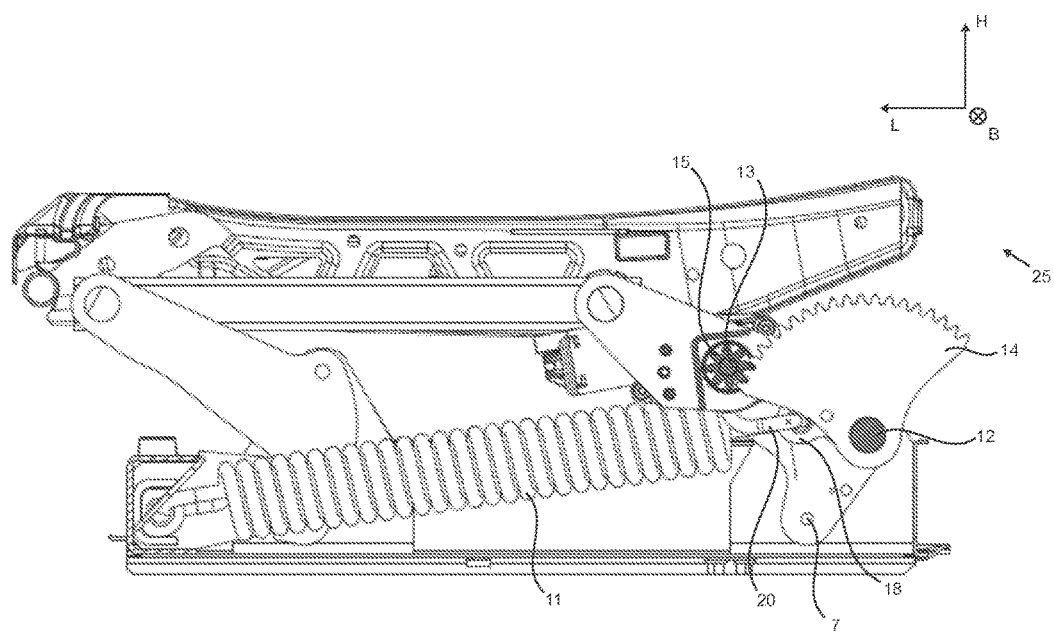
FIG. 3B is a second side view of the alternative embodiment according to FIG. 3A.
Figure 3C:
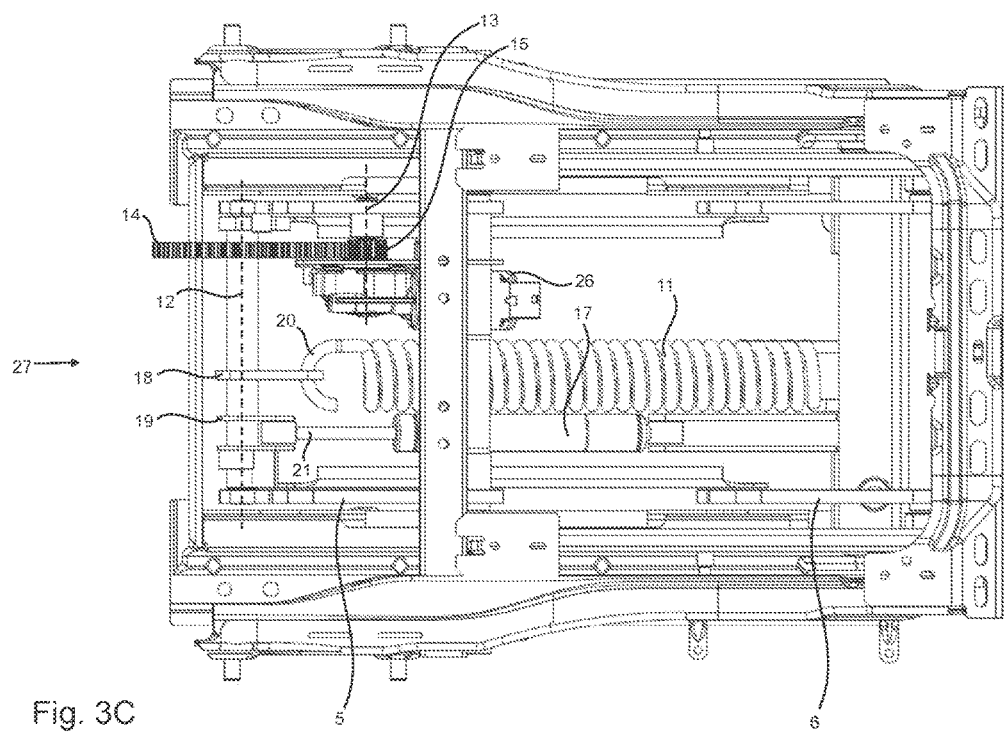
FIG. 3C is a plan view of the embodiment according to FIGS. 3A and 3B.

The first toothed wheel element 14 can be in the form of a circular toothed wheel or in the form of a toothed wheel shaped as a circle sector, as shown for example in FIG. 3A to 3C.

FIG. 3A to 3C show another embodiment, wherein the second toothed wheel element 15 can be driven by an electric motor 26 or an electric drive 26. FIG. 3A is a first side view of the suspension device 1, FIG. 3B is a second side view of the suspension device 1, and FIG. 3C is a plan view of the suspension device 1.

In the following, an electric motor or motor is to be understood as a generic term for an electric motor, an electric drive, or an electric motor gear assembly.

According to this embodiment, the first axis of rotation 12 is formed in parallel with the second axis of rotation 13, wherein in particular the first 12 and the second axis of rotation 12 are arranged so as to extend in the horizontal direction B of the seat.

The first toothed wheel element 14 is formed so as to be in the shape of a sector of a circle so that space requirements can be reduced. As can further be seen, the electric motor 26 is also connected to the first swivel connector 5 so that when the first swivel connector 5 is pivoted, the motor 26 is correspondingly pivoted about the first swivel pin 7. The motor 26 is connected to the second toothed wheel element 15, as can be seen in particular from FIG. 3B, so that the second toothed wheel element 15 can be rotated about the second axis of rotation 13 by the motor 26.

By rotating the second toothed wheel element 15 about the second axis of rotation 13, by means of the connection of the first toothed wheel element 14 to the second toothed wheel element 15, the first toothed wheel element 14 is rotated about the first axis of rotation 12, and accordingly the position of the first end region 20 of the spring unit and the position of the first end region 21 of the vibration damper are changed by operating the adjustment device 27 by rotating the first toothed wheel element 14.

FIG. 3C is a plan view of the suspension device 1 according to FIG. 3A and FIG. 3B.

All of the features disclosed in the application documents are claimed as essential to the invention, whether they are novel individually or in combination over the prior art.

LIST OF REFERENCE NUMERALS 1 suspension device
2 vehicle seat
3 upper suspension portion
4 lower suspension portion
5 first swivel connector
6 second swivel connector
7 first swivel pin
8 second swivel pin
9 third swivel pin
10 fourth swivel pin
11 spring unit
12 first axis of rotation
13 second axis of rotation
14 first toothed wheel element
15 second toothed wheel element
16 operating lever
17 vibration damper
18 first suspending device
19 second suspending device
20 first end region of the spring unit
21 first end region of the vibration damper
22 backrest
23 seat portion
24 seat front face
25 seat rear face
26 electric motor
27 adjustment device

The invention claimed is:

1. A suspension device for a vehicle seat, comprising:
an upper suspension portion and a lower suspension portion, which are interconnected by a first swivel connector and a second swivel connector, and the first swivel connector and the second swivel connector are each configured to be pivoted about a swivel pin in response to an oscillating movement of the upper suspension portion relative to the lower suspension portion,
wherein a first toothed wheel element which is rotatable about a first axis of rotation is arranged on the first swivel connector, the first toothed wheel element being in operative contact with a second toothed wheel element which is rotatable about a second axis of rotation, wherein rotation of the second toothed wheel element rotates the first toothed wheel element, which adjusts a position of a first spring unit to change a spring force of the suspension device,
wherein a first end region of the first spring unit is connected to an adjustment device which is connected to the first swivel connector and rotatable about the first axis of rotation, and a second end region of the first spring unit is connected to the lower suspension portion.

2. The suspension device according to claim 1, wherein the adjustment device comprises a first suspending device, to which the first end region of the first spring unit is connected, wherein the connection between the first spring unit and the first suspending device is offset from the first axis of rotation.

3. The suspension device according to claim 2, wherein the adjustment device comprises a second suspending device, to which a first end region of a vibration damper is connected, wherein the connection between the vibration damper and the second suspending device is offset from the first axis of rotation, and a second end region of the vibration damper is connected to the lower suspension portion.

4. The suspension device according to claim 1, wherein the first axis of rotation of the first toothed wheel element and the second axis of rotation of the second toothed wheel element are perpendicular to one another.

5. The suspension device according to claim 1, wherein the first axis of rotation of the first toothed wheel element and the second axis of rotation of the second toothed wheel element are parallel with one another.

6. The suspension device according to claim 1, wherein the second toothed wheel element is configured to be operated by a manually operated lever element.

7. The suspension device according to claim 1, wherein the second toothed wheel element is configured to be operated by one of an electric motor, an electric drive and a motor gear assembly.

* * * * *